(12) United States Patent
Dressel et al.

(10) Patent No.: US 11,201,377 B2
(45) Date of Patent: Dec. 14, 2021

(54) CONNECTION ARRANGEMENT FOR CONNECTING AT LEAST ONE VOLTAGE SOURCE AND/OR VOLTAGE SINK WHICH IS IN THE FORM OF A CELL TO AN EXTERNAL ELECTRICAL COMPONENT AND ELECTRICAL ARRANGEMENT COMPRISING A CONNECTION ARRANGEMENT

(71) Applicant: TE Connectivity Germany GmbH, Bensheim (DE)

(72) Inventors: Andre Martin Dressel, Lampertsheim (DE); Bart Van Sebroeck, Bensheim (DE); Uwe Hauck, Kleinmachnow (DE); Wilhelm Grzywok, Munich (DE); Peter Bormuth, Heppensheim-Sonderbach (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 15/140,668

(22) Filed: Apr. 28, 2016

(65) Prior Publication Data
US 2016/0240832 A1    Aug. 18, 2016

Related U.S. Application Data

(63) Continuation of application No. PCT/EP2014/073019, filed on Oct. 27, 2014.

(30) Foreign Application Priority Data

Oct. 28, 2013  (DE) .......................... 102013221870.2

(51) Int. Cl.
*H01R 12/69*       (2011.01)
*H01M 50/502*     (2021.01)
(Continued)

(52) U.S. Cl.
CPC ....... *H01M 50/502* (2021.01); *H01M 50/528* (2021.01); *H01R 12/63* (2013.01);
(Continued)

(58) Field of Classification Search
CPC ............ H01M 10/482; H01M 50/502; H01M 50/528; H01M 2220/20; H01R 12/62;
(Continued)

(56) References Cited

U.S. PATENT DOCUMENTS 3,836,401 A   9/1974   Niklas et al.
4,963,699 A   10/1990  Urushibata et al.
(Continued)

FOREIGN PATENT DOCUMENTS

CN   102308433 A   1/2012
DE   2142768 A2   3/1973
(Continued)

OTHER PUBLICATIONS

English translation of The First Office Action, dated Apr. 19, 2017, 10 pages.
(Continued)

*Primary Examiner* — Haixia Zhang
(74) *Attorney, Agent, or Firm* — Barley Snyder

(57) ABSTRACT

A connection arrangement is disclosed. The connection arrangement comprises a cell contact in contact with a cell in the form of at least one of a voltage source and a voltage sink, a cell connection line connected to the cell contact, and a connection line connected to the cell connection line at an end opposite the cell contact, the connection line connecting the cell connection line to an external electrical component.

17 Claims, 3 Drawing Sheets

(51) Int. Cl.
*H01R 12/63* (2011.01)
*H01M 50/528* (2021.01)
*H01R 12/62* (2011.01)
*H01R 43/24* (2006.01)

(52) U.S. Cl.
CPC ......... *H01R 12/69* (2013.01); *H01M 2220/20* (2013.01); *H01R 12/62* (2013.01); *H01R 43/24* (2013.01)

(58) Field of Classification Search
CPC ........ H01R 12/63; H01R 12/69; H01R 43/24; Y02E 60/10
See application file for complete search history.

(56) References Cited

U.S. PATENT DOCUMENTS

| | | | |
|---|---|---|---|
| 5,007,280 A | 4/1991 | Quinn et al. | |
| 6,152,776 A | 11/2000 | Ikeda et al. | |
| 6,168,470 B1* | 1/2001 | Ikeda | H01M 2/206 439/620.08 |
| 6,663,400 B1* | 12/2003 | Yokoyama | H05K 1/147 174/88 R |
| 9,660,357 B1 | 5/2017 | Worsham | |
| 9,780,345 B2 | 10/2017 | Heck | |
| 2008/0156437 A1 | 7/2008 | Kawate et al. | |
| 2009/0223041 A1 | 9/2009 | Garrison et al. | |
| 2011/0027634 A1* | 2/2011 | Kishimoto | H01M 2/206 429/90 |
| 2012/0019061 A1 | 1/2012 | Nishihara et al. | |
| 2012/0161677 A1 | 6/2012 | Kunimitsu et al. | |
| 2013/0157112 A1 | 6/2013 | Lim et al. | |
| 2015/0188244 A1* | 7/2015 | Yoshioka | H01M 2/20 439/442 |

FOREIGN PATENT DOCUMENTS

| | | |
|---|---|---|
| DE | 19847111 A1 | 5/1999 |
| DE | 102011056718 A1 | 6/2013 |
| DE | 102012205019 A1 | 10/2013 |
| DE | 102012205910 A1 | 10/2013 |
| EP | 0337400 A2 | 4/1989 |
| JP | H02-036710 A | 2/1990 |
| JP | 2005-116434 A | 4/2005 |
| JP | 2006-245453 A | 9/2006 |
| JP | WO2010113455 A1 | 10/2010 |
| JP | WO2011024477 A1 | 3/2011 |
| JP | 2012-227002 A | 11/2012 |
| JP | 2013152918 A | 8/2013 |
| JP | 2005222701 A | 8/2018 |
| WO | 2011038908 A1 | 4/2011 |
| WO | 2012026093 A1 | 3/2012 |

OTHER PUBLICATIONS

The First Office Action, dated Apr. 19, 2017, 8 pages.
International Search Report, Application No. PCT/EP2014/073019, dated Jan. 7, 2015, 4 pages.
Chinese Third Office Action and English translation, dated May 3, 2018, 18 pages.
Japanese Notice of Reasons for Refusal with English translation, Japanese Patent Application No. 2016-526091, dated Mar. 26, 2019, 13 pages.
Abstract of WO 2012/026093 A1, dated Mar. 1, 2012, 2 pages.
Japanese Notice of Reasons for Refusal, English translation, dated Aug. 8, 2018, 4 pages.
Abstract of JP 2012-227002 A, dated Nov. 15, 2012, 1 page.
Abstract of JP 2005-116434 A, dated Apr. 28, 2005, 1 page.
German Office Action, dated Oct. 27, 2020, 6 pages.
Abstract of DE 102012205910, dated Oct. 17, 2013, 1 page.
Abstract of DE 102011056718, dated Jun. 20, 2013, 1 page.
Abstract of DE 102012205019, dated Oct. 2, 2013, 1 page.
English translation of JP 2005222701, dated Aug. 5, 2018, 14 pages.
Korean Office Action, dated Aug. 19, 2020, 4 pages.

* cited by examiner

CONNECTION ARRANGEMENT FOR CONNECTING AT LEAST ONE VOLTAGE SOURCE AND/OR VOLTAGE SINK WHICH IS IN THE FORM OF A CELL TO AN EXTERNAL ELECTRICAL COMPONENT AND ELECTRICAL ARRANGEMENT COMPRISING A CONNECTION ARRANGEMENT

CROSS-REFERENCE TO RELATED APPLICATIONS

This application is a continuation of International Application No. PCT/EP2014/073019, filed on Oct. 27, 2014, which claims priority under 35 U.S.C. § 119 to German Application No. 102013221870.2, filed on Oct. 28, 2013.

FIELD OF THE INVENTION

The present invention relates to a connection arrangement, and more particularly, to a connection arrangement for connecting a cellular electrical element to an external electrical component.

BACKGROUND

As is known in the prior art, voltage sources and/or voltage sinks in the form of cells may be used in electrically driven vehicles in the form of galvanic cells, capacitors or super-capacitors. They are used therein to repeatedly take up and discharge electrical energy. In this instance, a plurality of cells are generally arranged one behind the other or beside each other. Connection arrangements are required to tap and control the voltage individually and obtain current from the cells. Since such electrical systems are often subjected to adverse environmental conditions, in previous solutions regions in which a connection is present are encapsulated, for example, by sealing, in order to prevent corrosion. This results in a high level of production complexity for arrangements with a large number of cells.

SUMMARY

An object of the invention, among others, is to provide a connection arrangement with low production complexity. The disclosed connection arrangement comprises a cell contact in contact with a cell in the form of at least one of a voltage source and a voltage sink, a cell connection line connected to the cell contact, and a connection line connected to the cell connection line at an end opposite the cell contact, the connection line connecting the cell connection line to an external electrical component.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a connection arrangement. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
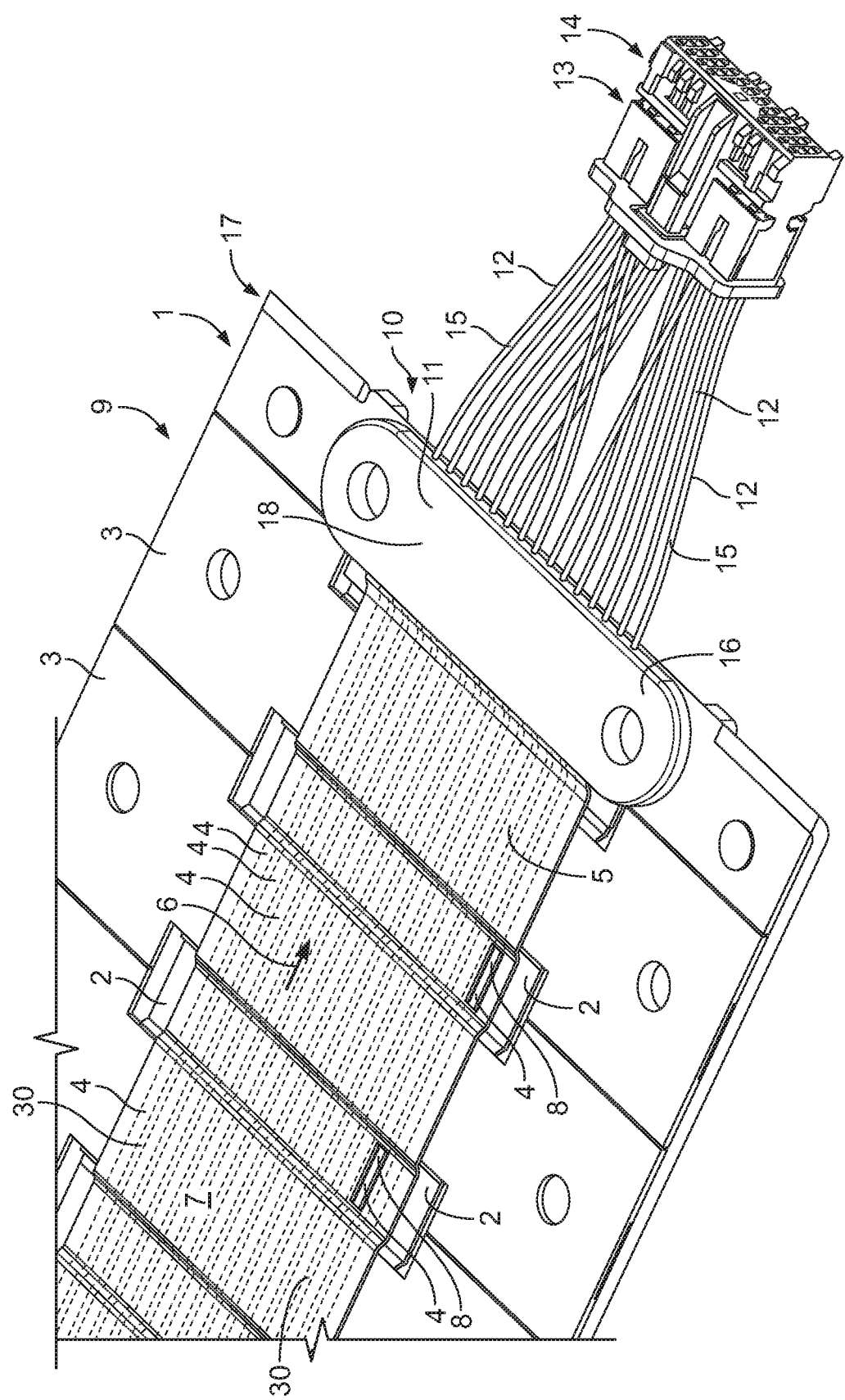
FIG. 1 is a perspective view of a connection arrangement according to the invention.

FIG. 1 illustrates a connection arrangement 1 according to the invention.

The connection arrangement 1 includes covers 3, ribbon-like retention member 9, connection lines 12, and external electrical component 13. The major components of the invention will now be described in greater detail.

The covers 3 are elongated members covering voltage sources (not shown). The voltage sources may simultaneously act as voltage sinks so that, in accordance with requirements, electrical power can be drawn or supplied and, for instance, stored.

The ribbon-like retention member 9 has cell contacts 2 and a ribbon-like connector 5. The ribbon-like connector 5 has cell connection lines 4 embedded in the ribbon-like connector 5 and extending beside each other, in particular in a parallel manner along the extent direction 6 of the ribbon-like connector 5. The ribbon-like connector 5 is produced in this instance by a flat ribbon line, a so-called FFC (Flat Flex Cable). It comprises an insulating outer member 30, which may be a plastics material. The cell connection lines 4 are embedded in the insulating outer member 30. The ribbon-like retention member 9 also has a connection region 10 at one end 11.

Each of a plurality of cell contacts 2 is connected to a cell connection line 4. The ribbon-like connector 5 has at the upper side 7 thereof welding openings 8 which are aligned with welding openings 8 fitted at the lower side of the ribbon-like connector 5. In the region of the welding openings 8, the cell connection lines 4 of the ribbon-like connector 5 which are exposed may be welded to the cell contacts 2. Since the cell contacts 2 and the cell contact line 4 comprise the same material, for instance, in the example shown, aluminium, encapsulation of the connection is unnecessary because there is not present between the two any electrochemical voltage which could result in corrosion between the two. Alternatively, for instance, copper could be used as the material for the cell connection line 4 and the cell contacts 2.

The connection lines 12 may comprise a conductive material known to those with ordinary skill in the art, for example, copper or aluminium. The connection lines 12 are surrounded by insulation 15, with which they form a cable.

External electrical component 13 may be in the form of a plug 14.

The connections of the connection arrangement 1 will now be described.

The cell contacts 2 are connected to the voltage sources (not shown) located under covers 3. The ribbon-like connector 5 may be bonded to the cell contacts 2 and/or the covers 3, for example, by melting an adhesive or the material of the outer member 30.

The cell connection lines 4 and connection lines 12 are connected at connection region 10. The cell connection lines 4 and connection lines 12 may be connected by means of a crimping. The connection lines 12 serve to connect the cell connection lines 4 to the external electrical component 13.

The connection region 10 may have a protective layer (not shown). The protective layer may comprise a metal, for instance, a precious metal, a plastics material or another insulating material. The protective layer may also particularly bring about electrical insulation.

The connection region 10 between the cell connection lines 4 and the connection lines 12 is encapsulated by a casting compound 16. The casting compound 16 encapsulates all the connection regions between a cell connection line 4 and a connection line 12 at the same time, including the crimping, protecting the connection region 11 from environmental influences. The casting compound 16 is in this instance a low-pressure casting compound which is applied in an injection-moulding step, for example, by overmoulding.

The casting compound 16 is fixed to a base member 17. It is connected to the base member 17 in a mechanically stable manner and consequently forms a tension relief member 18 for the cell connection line 4. Tensile forces from the region of the plug 14 and the connection line 12 are taken up by the tension relief member 18 and directed into the base member 17 so that the cell connection lines 4 are not subjected to any mechanical loads.

Alternatively or additionally to the casting compound 16, the connection region 11 may be covered by a covering layer, for instance, by an impressed covering layer or a covering layer comprising a rapidly hardening dispersion adhesive. The material of the covering layer may comprise a material which hardens alone or by means of external influences, for instance, by UV irradiation. Furthermore, the covering layer may comprise, for example, two materials which only harden when they are in contact with each other. A casting compound 16 may also comprise the materials mentioned.

As a result of the encapsulation with the casting compound 16, if the connection lines 12 comprise a different material from that of the cell connection lines 4, the connection produced in this manner is not at risk of corrosion. In an alternative embodiment, if the connection lines 12 comprise the same material as the cell connection lines 4 and the cell contacts 2, encapsulation of the connection region 11 between the cell connection lines 4 and the connection lines 12 would not be absolutely necessary because there is also then no electrochemical potential between the two in this instance. A change to another material, for example, to copper, could then be brought about in the region of the plug 14.

Figure 2:
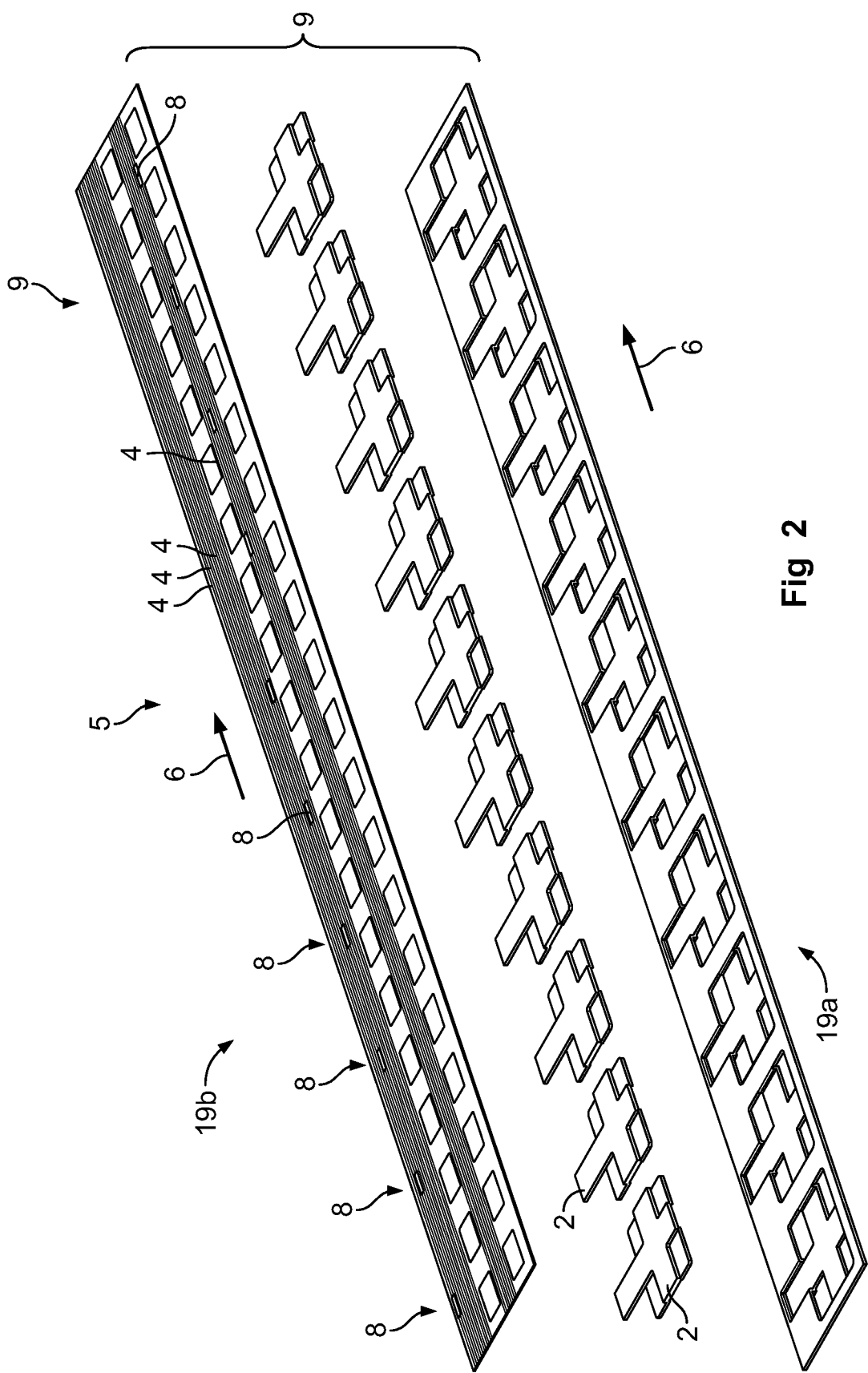
FIG. 2 is a perspective exploded view of a portion of another connection arrangement according to the invention.

A connection arrangement 1 according to another embodiment of the invention is shown in FIG. 2. A plurality of cell contacts 2 are arranged one behind the other in an extent direction 6 of a ribbon-like connector 5. The cell connection lines 4 are embedded as thin wires in the ribbon-like connector 5 and are connected to a cell contact 2 in the region of a welding opening 8, respectively. The cell contacts 2 and the cell connection lines 4 are secured in a ribbon-like retention member 9. What is not shown in this instance, at one end of the ribbon-like retention member 9, is a connection region in which the cell connection lines 4 are connected to connection lines. The ribbon-like retention member 9 has a lower portion 19a comprising a deep-drawn plastics plate with openings 20 and an upper portion 19b which is in the form of a flat ribbon line in shown example. The cell contacts 2 are embedded between the lower portion 19a and the upper portion 19b.

Figure 3:
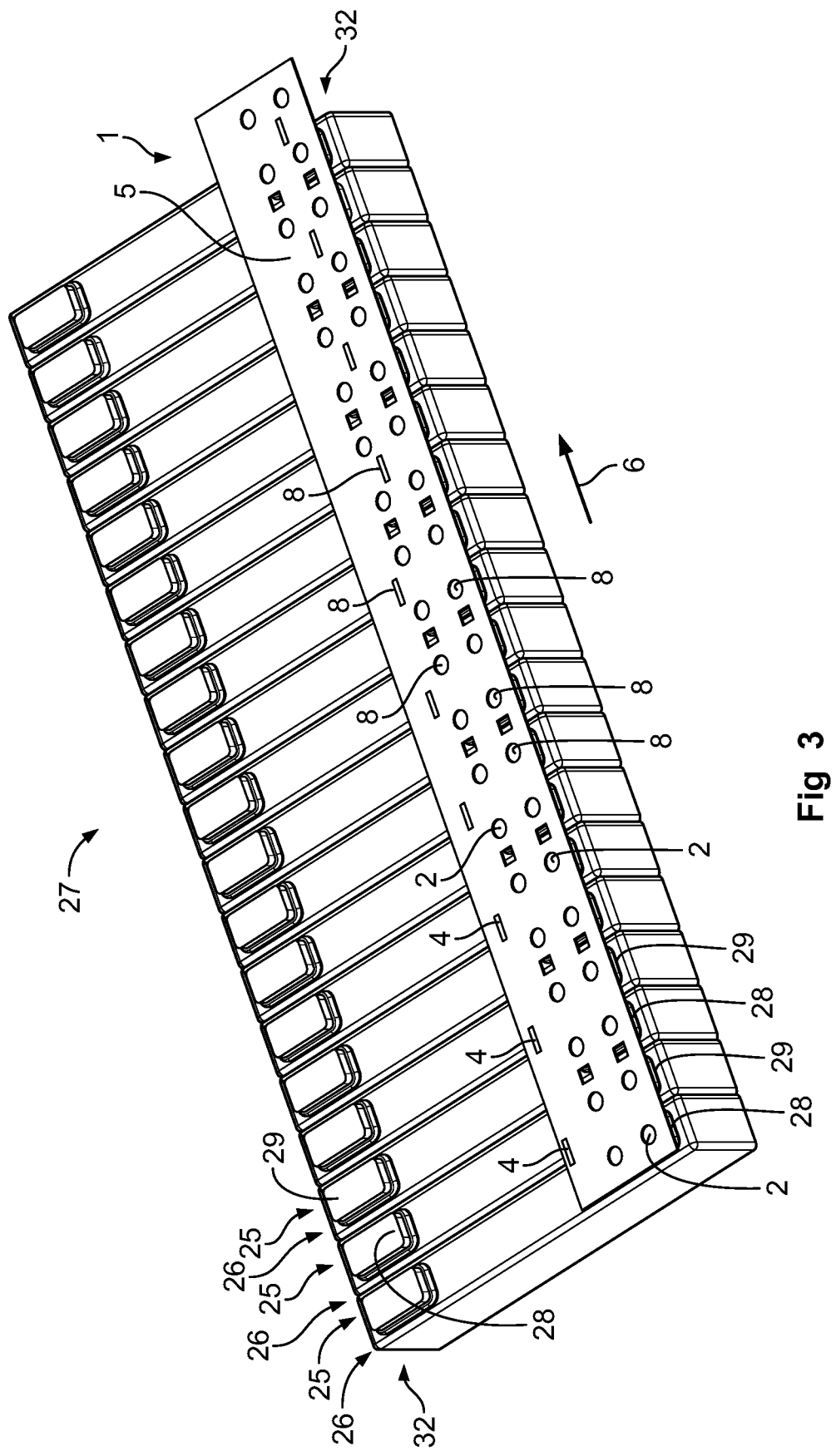
FIG. 3 is a perspective view of a portion of a connection arrangement according to the invention together with a plurality of voltage sources and voltage sinks.

FIG. 3 illustrates by way of example a use of a connection arrangement 1 according to the invention. The connection arrangement 1 is only partially shown. FIG. 3 shows a traction battery 27, in which a large number of voltage sources and voltage sinks 25 in the form of galvanic cells 26 are connected to each other. The Figures show by way of example galvanic cells 26 as voltage sources and sinks 25 in the form of cells. Alternatively, other types of voltage sources and/or sinks 25 in the form of cells may also be used, for example, capacitors, in particular super-capacitors ("Supercaps"). The voltage sources and voltage sinks 25 are arranged in a row one behind the other, a voltage source and voltage sink 25 being rotated through 180° relative to the adjacent voltage sources and sinks so that an anode 28 is located between two cathodes 29, respectively.

An anode 28 and a cathode 29 of two different galvanic cells 26 are connected to each other via the cell contacts 2. The galvanic cells can be contacted by the cell contacts 2, for example, through openings 20 in the lower portion 19a. The cell contacts 2 can be contacted at a total of four locations from below per cell contact 2. Two of the locations are used to contact an electrode of a first galvanic cell, and two of the locations are used to contact an electrode of a second galvanic cell; the anode 28 of a first galvanic cell can be bridged with the cathode 29 of a second galvanic cell by the cell contact 2. A second cell contact 2 can again connect the anode of the second galvanic cell to the cathode of a third galvanic cell, etc. Voltage is built up as a result of this serial connection of the galvanic cells. In an alternative embodiment, a parallel connection could also be brought about, for example, in order to be able to draw a high current. In the serial connection shown, a cell connection line 4 is used to tap a control voltage at the cell contacts 2. The function and the charging state of the individual galvanic cells can thereby be monitored constantly.

Alternatively to the shown contact arrangement of a galvanic cell with a cell contact 2, a cell contact 2 can also be constructed in such a manner that it is simultaneously an electrode of the galvanic cell. It is thereby possible to save an element, whereby the production costs are reduced.

In order to be able to tap a voltage at a location between two voltage sources 25, the cell connection lines 4 are connected to the cell contacts 2. The cell connection lines 4 extend parallel with each other along an extent direction 6 of the ribbon-like connector 5 and lead to the edge of the traction battery 27. Another connector 5 (not illustrated here) connects the electrodes which are illustrated at the top in FIG. 3. That second connector 5 is offset relative to the first connector 5 by a cell so that overall the current path extends substantially in a zig-zag manner. At ends 32, the cell contacts 2 are connected only to a single electrode of a galvanic cell 26. The total voltage can then be tapped at those cell contacts 2.

What is claimed is:

1. A connection arrangement, comprising:
   a cover defining an opening formed therethrough and disposed to cover a cell, wherein the cell is in a form of at least one of a voltage source or a voltage sink;
   a cell contact disposed under the cover and in contact with the cell;
   a cell connection line welded to the cell contact in the area of the opening of the cover and disposed on an exterior surface of the cover opposite the cell, the cell connection line is a portion of a flat ribbon line or a flat ribbon cable; and
   a connection line connected to the cell connection line at an end opposite the cell contact, the connection line connecting the cell connection line to an external electrical component.

2. The connection arrangement of claim 1, wherein the cell connection line and the cell contact are the same material.

3. The connection arrangement of claim 2, wherein the connection line is crimped to the cell connection line.

4. The connection arrangement of claim 3, wherein the cell contact and the cell connection line are secured in a ribbon-like retention member.

5. The connection arrangement of claim 4, wherein the ribbon-like retention member has a connection region at one end at which the cell connection line and connection line are connected.

6. The connection arrangement of claim 5, wherein the connection region is encapsulated.

7. The connection arrangement of claim 6, wherein the connection region has a protective layer.

8. The connection arrangement of claim 7, wherein a casting compound is disposed around the connection region.

9. The connection arrangement of claim 8, wherein the casting compound is a low-pressure injection-moulding compound.

10. The connection arrangement of claim 9, wherein the casting compound secures the cell connection line to a base member.

11. The connection arrangement of claim 6, wherein the cell connection line contains aluminum.

12. The connection arrangement of claim 1, further comprising a plurality of cell connection lines.

13. The connection arrangement of claim 12, wherein the plurality of cell connection lines are arranged beside each other in the flat ribbon line or the flat ribbon cable.

14. The connection arrangement of claim 6, wherein the connection line and the cell contact are the same material.

15. The connection arrangement of claim 1, wherein the connection line is surrounded by an insulation and forms a cable.

16. The connection arrangement of claim 1, wherein the portion of the flat ribbon line or the flat ribbon cable is bonded to the cover.

17. The connection arrangement of claim 1, wherein the portion of the flat ribbon line or the flat ribbon cable has a welding opening through which a weld is formed to connect the cell contact to the cell connection line.

* * * * *